(12) United States Patent
Lindblom

(10) Patent No.: US 10,970,029 B2
(45) Date of Patent: Apr. 6, 2021

(54) DYNAMIC USER INTERFACE AND MODULE FACILITATING CONTENT SHARING IN A DISTRIBUTED COMPUTING ENVIRONMENT

(71) Applicant: Symphony Communication Services Holdings LLC, Palo Alto, CA (US)

(72) Inventor: Jonas Lindblom, Solna (SE)

(73) Assignee: Symphony Communication Services Holdings LLC, Palo Alto, CA (US)

( * ) Notice: Subject to any disclaimer, the term of this patent is extended or adjusted under 35 U.S.C. 154(b) by 0 days.

(21) Appl. No.: 16/160,946

(22) Filed: Oct. 15, 2018

(65) Prior Publication Data
US 2020/0117415 A1 Apr. 16, 2020

(51) Int. Cl.
*G06F 3/0484* (2013.01)
*G06F 3/14* (2006.01)
*H04L 29/08* (2006.01)

(52) U.S. Cl.
CPC .......... *G06F 3/1462* (2013.01); *G06F 3/0484* (2013.01); *H04L 67/10* (2013.01)

(58) Field of Classification Search
CPC .... G06F 3/1462; G06F 3/1454; G06F 3/0484; G06Q 10/10; H04L 67/10
See application file for complete search history.

(56) References Cited

U.S. PATENT DOCUMENTS

| | | | |
|---|---|---|---|
| 6,877,027 B1 * | 4/2005 | Spencer | G06F 3/1454 709/205 |
| 9,497,412 B1 | 11/2016 | Rosenberg | |
| 9,961,299 B2 | 5/2018 | Rosenberg | |
| 10,491,858 B2 | 11/2019 | Rosenberg | |
| 2002/0158970 A1 * | 10/2002 | Takeshi | H04N 1/00127 348/211.3 |
| 2007/0186235 A1 * | 8/2007 | Jarman | H04N 21/25891 725/28 |
| 2007/0294623 A1 | 12/2007 | Saavedra | |
| 2008/0133663 A1 | 6/2008 | Lentz | |
| 2009/0265487 A1 | 10/2009 | Zhang et al. | |
| 2010/0218120 A1 * | 8/2010 | Gaurav | G06Q 10/10 715/753 |
| 2013/0139066 A1 * | 5/2013 | Sato | G06F 3/0484 715/744 |
| 2013/0182063 A1 * | 7/2013 | Jaiswal | H04L 12/1827 348/14.08 |

(Continued)

OTHER PUBLICATIONS

Int'l Search Report and Written Opinion of the ISA/EP in PCT/US2019/055594; dated Dec. 3, 2019; 14pgs.

*Primary Examiner* — Daniel Samwel
(74) *Attorney, Agent, or Firm* — Goodwin Procter LLP

(57) ABSTRACT

A sharing client device shares content with viewing client devices. A sharing module operating on a sharing client device and on the viewing client devices facilitates the creation and analysis of viewer snapshots, permitting automatic determination of whether viewers are up-to-date with their display of shared content. Based on the analysis and on a policy of the sharing module, the sharing module can take a number of actions, such as generating and displaying a viewer summary that a user of the sharing client device may view to determine whether, or to what extent, the viewing client devices are up-to-date in their displays of the shared content.

24 Claims, 5 Drawing Sheets

(56) References Cited

U.S. PATENT DOCUMENTS

| | | | |
|---|---|---|---|
| 2014/0244579 A1* | 8/2014 | Bhogal | G06F 16/954 707/623 |
| 2015/0113369 A1* | 4/2015 | Chan | G06F 3/1454 715/203 |
| 2017/0279860 A1 | 9/2017 | Agarwal et al. | |
| 2018/0160166 A1 | 6/2018 | Sprenger et al. | |
| 2018/0278976 A1 | 9/2018 | Mao et al. | |

* cited by examiner

DYNAMIC USER INTERFACE AND MODULE FACILITATING CONTENT SHARING IN A DISTRIBUTED COMPUTING ENVIRONMENT

FIELD OF ART

The present invention generally relates to the field of user interfaces, and more specifically, to methods and user interfaces for determining, reacting to, and summarizing whether viewers of content shared over a digital network are synchronized with respect to the sharer of the content.

BACKGROUND

Many users wish to share some or all of the contents of their computer screens with others, such as when giving a presentation to others within a geographically distributed organization. However, factors such as network latency may lead to lengthy (and possibly inconsistent) times before a shared screen portion has been propagated to the screens of others with whom the portion is being shared. The problem is particularly exacerbated in the case of wide geographic distributions, such as when the members of an organization are located on different continents, which leads to greater network latency, and/or when the content requires more bandwidth, such as in the case of large high-resolution images. Accordingly, in many cases, those sharing portions of their screens ("sharers") feel the need to pause and seek confirmation from other sharing recipients ("viewers") that they have received the latest updates. These pauses have various associated disadvantages, such as the breaking of the flow of the sharer's narrative, as well as the confusion inherent in the viewers trying to guess whether what they see is the same as what the sharer sees.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
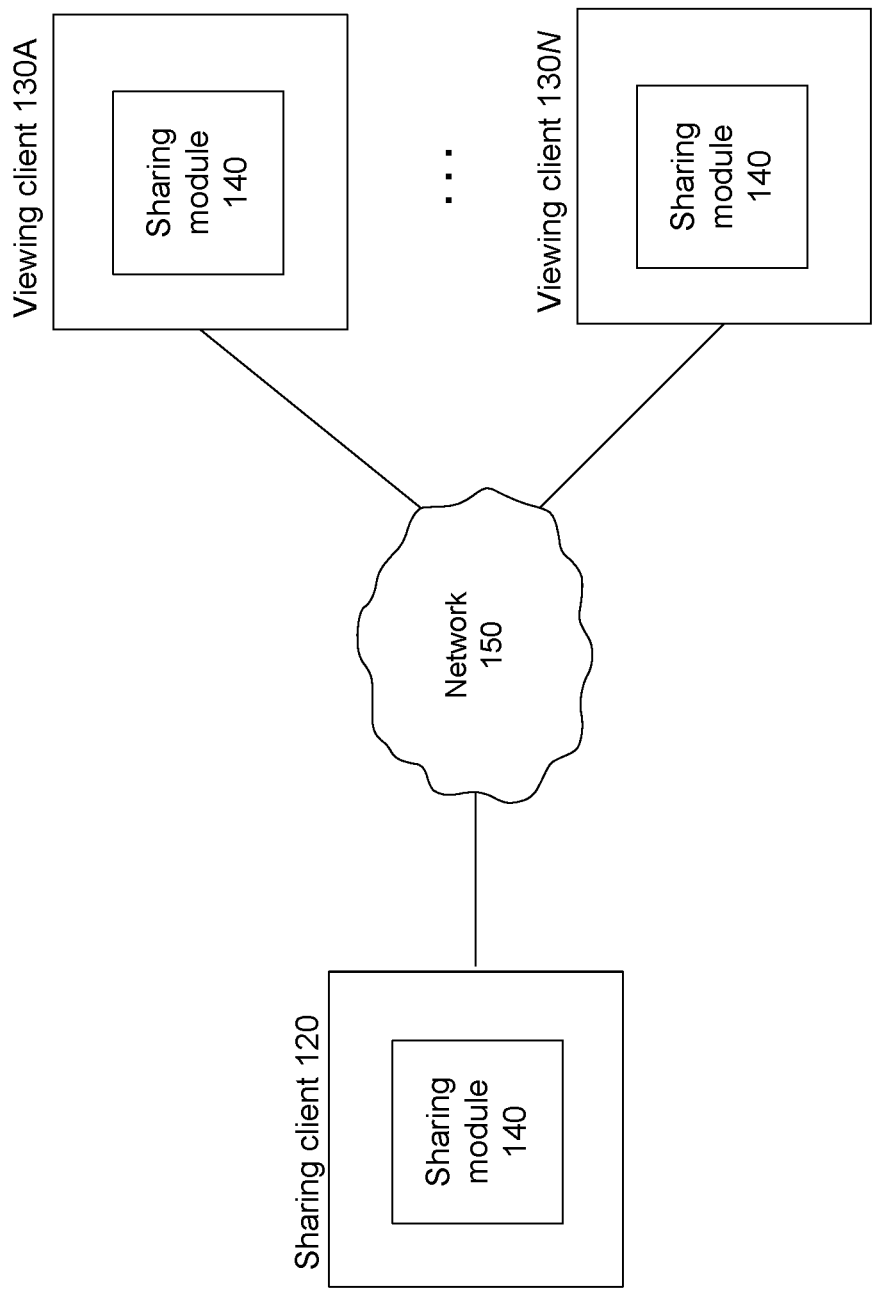
FIG. 1 illustrates a detailed view of a computing environment in which screen portions are shared among different client devices, according to one embodiment.

FIG. 1 illustrates a detailed view of a computing environment in which screen portions are shared among different client devices, according to one embodiment.

To address the problems inherent in screen sharing over a distributed computer network, each device involved in the sharing has a sharing module 140 that together provide to the sharer a graphical view of the shared content that is currently being displayed to the viewers. The techniques and user interfaces disclosed herein enable a sharer of content, such as an employee giving a presentation over a distributed network, to readily determine whether viewers are up-to-date with the shared content. Alternatively and/or additionally, the sharing module 140 of the sharer may automatically apply a policy on behalf of the sharer based on whether the viewers are up-to-date (e.g., halting advancing of a presentation if viewers are not up-to-date, or suggesting advancing of a slide once the viewers all become up-to-date). This eliminates the need for the imprecise and disruptive pauses inherent in the sharer explicitly asking viewers for confirmation of whether they see the current content, allowing the presentation or other sharing to proceed more smoothly and naturally.

The sharing module 140 may be implemented in different manners in different embodiments. For example, in some embodiments, the sharing module 140 is implemented as a plugin or extension for a browser(s) used by the sharer and viewer. In some embodiments, functionality of the sharing module 140 is implemented directly within application code of a browser or other application (e.g., code implementing WebRTC), or in client-side code of web pages performing the screen sharing (e.g., JavaScript code making WebRTC calls). The implementations of the sharing module 140 may also differ on different client devices, such as an extension on the sharing client device 120, and within the browsers on the viewing client devices 130. The sharing module 140 may also be implemented in native clients of desktop operations, native mobile applications of smartphones, or the like. The functionality of the sharing module 140 is described in additional detail below with respect to FIG. 3.

The client device 120 of the sharer, and the client devices 130 of the viewers, are computing devices such as smart phones, laptop computers, desktop computers, or any other devices supporting graphical applications (e.g., web browsers) capable of rendering graphical content on the client devices. For the sake of simplicity, only one sharing client device 120 and two viewing client devices 130 are illustrated in FIG. 1, although in practice there could be any number of each.

The network 150 may be any suitable communications network for data transmission. In an embodiment such as that illustrated in FIG. 1, the network 150 uses standard communications technologies and/or protocols and can include the Internet. In another embodiment, the entities use custom and/or dedicated data communications technologies.

Figure 2:
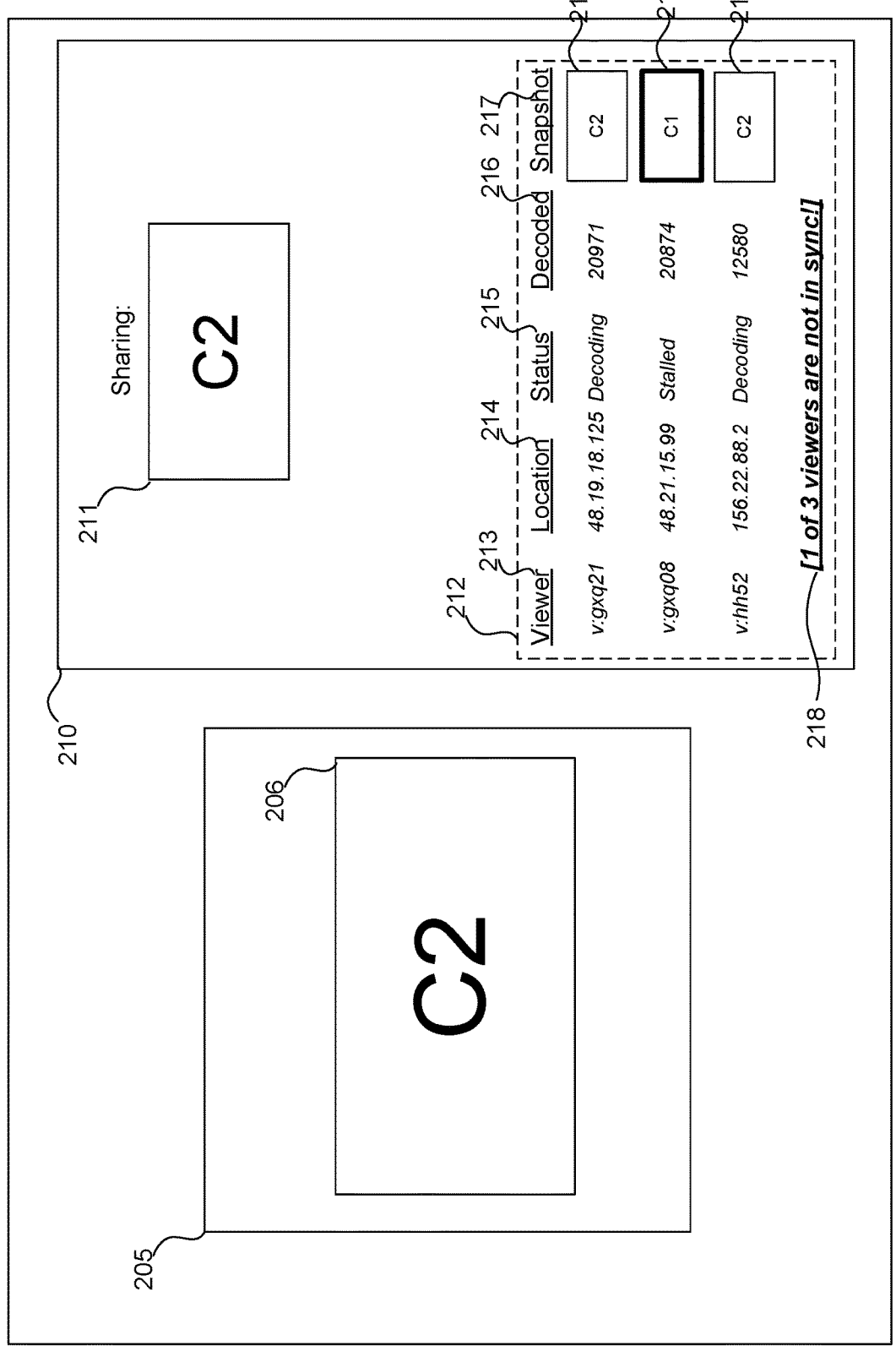
FIG. 2 illustrates a user interface seen by a sharer when sharing content, according to one embodiment.

FIG. 2 illustrates a user interface 200 seen by a sharer when sharing content, according to one embodiment. Region 205 includes a region 206 containing content that is visually shared with the viewing users (hereinafter "shared portion"). For example, region 205 could be an application window managed by an application such as presentation software, and region 206 could be the current slide displayed by the presentation software. As another example, region 205 could be an application for a web browser playing a video, and region 206 could be some or all of the playing video. In some embodiments, region 206 may also be set to encompass the entire screen or the entirety of region 205. Region 210 (e.g., a separate window) is generated by the sharing module 140 of the sharer's sharing client 120 and provides information on the sharing of the shared content. For example, region 210 contains a snapshot 211 illustrating the shared content 206, and a region 212 with metadata items 213-217, each describing a separate viewer. The example of FIG. 2 illustrates metadata items for three viewers having identifiers v:gxq21, v:gxq08, and v:hh52, respectively. The metadata items also include the network address 214 from which the viewers are communicating with the sharer, the status 215 of the sharing of the shared content (e.g., "Decoding", indicating that the viewers' client devices are in the process of rendering the shared content 206 received from the sharer over the network 150, or "Stalled" indicating that the network is currently not properly delivering data), the amount 216 of the shared content that has been decoded (e.g., 20,971 bytes), and a visual snapshot 217 of the state of the shared content 206. Other metadata 212 in some embodiments (not illustrated in FIG. 2) include round trip time (measuring latency of data sent between the sharer and viewer), and/or a visual indicator of the general network quality between the sharer and viewer (e.g., based on factors such as status 215 and/or round trip time), such as an icon representing "good", "acceptable", or "poor."

The sharer can look at the visual snapshot 217 for each viewer to determine what image of the shared content is presently displayed on the screen of the viewer. For example, in the example of FIG. 2, the sharer can glance at the snapshots 217A-217C (corresponding to the three viewers) and determine that snapshot 217B of the second viewer is different from the other snapshots (in that it displays content C1 rather than C2), and (more importantly) different from the snapshot 211 illustrating the current state of the shared content. The sharing module 140 may visually emphasize a snapshot (such as 217B) differing from the current state of the shared content (e.g., snapshot 211) to make it easier for the sharer to identify the viewers whose shared content has not yet been synchronized with that of the sharer, such as with the highlighting around snapshot 217B.

In some embodiments, the sharing module 140 includes within the visual summary an indicator 218 summarizing viewers that are in sync or not in sync with the sharer. For example, the indicator 218 in the example of FIG. 2 notes that one of the three viewers is not currently in sync with the sharer. This enables the sharer to make a quick determination of whether or not all viewers (or at least most viewers) are in sync, and therefore (for example) whether the sharer should proceed to discuss the shared content. The visual summary may also include a special visual indication that all viewers are (or are not) in sync with the sharer, such as a change in color, or a temporary flash, when all the viewers become in sync with the sharer.

Figure 3:
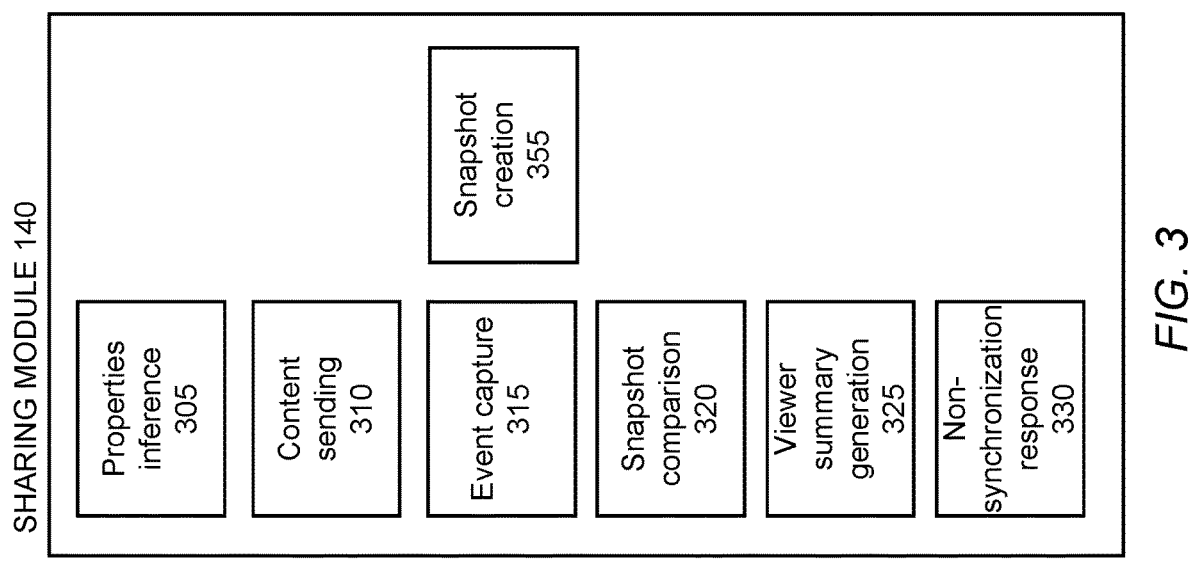
FIG. 3 is a block diagram illustrating sub-modules of the sharing module of FIG. 1, according to one embodiment.

FIG. 3 is a block diagram illustrating sub-modules of the sharing module 140, according to one embodiment.

In some embodiments, the sharing module 140 includes a properties inference module 305, which determines one or more properties of the sending of shared content from the sharer to the viewers.

For example, the properties inference module 305 may determine which portion of the content displayed on the screen of the sharer to share with the viewers, rather than (or in addition to) relying on the sharer to specify the portion. For instance, rather than requiring the sharer to specify sharing of the entire screen, of a particular window, or of a portion of the window, the properties inference module 205 may analyze the changing of the content displayed on the screen or within a particular application window over time (e.g., analyzing degrees of pixel changes across video frames), and based on the changes automatically identify a particular frequently-changing portion of the screen (e.g., a region in which presentation slides are displayed) and use it as the shared portion after confirming with the sharer.

As another example, in some embodiments the properties inference module 305 determines criteria defining a sharing trigger event for the sending of the shared portion from the sharer to the viewers. For instance, the criteria for the sending trigger event may be manually specified by the user (e.g., some fixed number of milliseconds). Or the properties inference module 305 may infer a period of time as the criterion for the sending trigger event by analyzing the frequency of changes to the shared portion (e.g., an average period of time between changes) and setting the period of time based on that frequency (e.g., sending the shared portion no more frequently than every 100 milliseconds). The properties inference module 305 may additionally and/or alternatively consider the content type of the shared content in the determination of the trigger, such as determining that the shared content is a presentation, and that therefore the trigger will be set based on the typical time that a presentation slide is displayed, or that the trigger will be set to a detectable event such as the transition from one slide to another. In other embodiments, there is no sending trigger event; rather, sending is performed automatically and continuously using a video codec such as VP8, VP9, H.264, or H.265, e.g., in WebRTC, and the video codec streams the shared content to the viewing clients 130.

The sharing module 140 includes a content sending module 310 that sends the shared portion to viewers. In some embodiments, as noted above, the sending is performed continuously using a video codec, in which case the content sharing module 310 sends only indirectly, by initiating the use of the video codec (e.g., via use of a scripting language in a web page in which the shared portion is located). In other embodiments, the content sending module 310 sends the shared portion only when the criteria for the sending trigger event indicate to do so (e.g., after the lapse of a fixed sending period of time). In some embodiments, the content sending module 310 compares the current state of the shared portion to the state of the shared portion that was most recently sent, refraining from sending the shared portion unless the current state and that prior state differ by at least some given threshold amount. This conserves bandwidth by only sending data for sufficiently large changes that would be noticeable by users. The content sending module 310 sends the data of the shared portion in different manners in different embodiments, such as in unchanged form, or in a form that requires less memory, such as a lower-resolution form or a compressed form.

In some embodiments, the sharing module 140 includes an event capture module 315 that monitors occurrences of events that indicate that the shared portion may have been updated and hence require being sent again to the viewers. For example, the event capture module 315 may monitor the detectable event, such as by using an application programming interface (API) of an application in which the content is displayed (e.g., a presentation program) to register to receive notification of such events, or by external monitoring of the application (e.g., by analyzing pixels of the region corresponding to the application, such as identifying degrees of pixel changes sufficiently large to indicate that an entire slide was likely changed, or by identifying low-level operating system input events, such as keypresses, mouse clicks, or other user input events).

The sharing module 140 includes a snapshot comparison module 320 that compares snapshots received from viewers with the current state of the shared portion in order to determine whether the viewers are synchronized or not with respect to the sharer. The snapshot comparison module 320 may process the shared portion so that it is readily comparable to the snapshots received from the viewers; e.g., if the snapshots are in compressed form, the snapshot comparison module 320 may compress the shared portion in a similar manner prior to comparing it to the snapshots, so as to obtain equivalent images for comparison. Each failure of the snapshots received from one of the viewers to match the current state of the shared portion indicates that that viewer is not synchronized with respect to the sharer (that is, with respect to the shared portion displayed on the screen of the sharer). A snapshot is considered to match the current state of the shared portion, or to match another snapshot, if the visual similarity (e.g., pixel-wise similarity) of the snapshot to the shared portion or other snapshot is at least some threshold level.

The sharing module 140 applies a policy to determine which actions to take in response to the determination of whether or not the viewers are synchronized with respect to the sharer. Different possible actions taken by the policy include those of a viewer summary generation module 325 that generates a visual summary of the shared portion that varies according to the synchronization status of the various viewers, and a non-synchronization response module 330 that takes an action in response to identifying one or more of the viewers that are not synchronized with respect to the sharer.

The sharing module 140 includes a viewer summary generation module 325 that generates a visual summary of the state of the shared portion as currently viewed by the various viewers. For example, the region 212 is one example of such a visual summary. In some embodiments, the viewer summary generation module 325 modifies the generation of the visual summary based on a count of the viewers. For example, if there are sufficiently few viewers (e.g., fewer than some predetermined number such as 7, or fewer than some function of the amount of available space for displaying the visual summary), then a visual summary such as region 212 of FIG. 2 may be employed, showing a snapshot for each viewer, along with accompanying metadata. Otherwise, however, less information can be displayed in the interests of avoiding visual clutter. For instance, the visual summary could contain a count derived from the number of viewers that have a snapshot not matching that for the current shared portion (e.g., the number of viewers that are, or that are not, currently seeing the shared portion), or a visual indication that all viewers are now seeing the current shared portion (i.e., that the snapshots of all the viewers match the shared portion of the sharer), without showing the details of each viewer.

The sharing module 140 additionally includes a non-synchronization response module 330 that takes an action in response to identifying one or more of the viewers that are not synchronized with respect to the sharer. In some embodiments, the non-synchronization response module 330 displays a visual indication to the sharer that the identified viewer(s) is not synchronized, such as by highlighting or otherwise visually emphasizing the username or other indication of the user within the visual summary. In some embodiments, the non-synchronization response module 330 modifies functionality (e.g., the user interface) of an application of the sharer that manages the shared portion so as to prevent further change to the shared portion, re-enabling the user interface of the application after all (or some threshold number or percentage of) the viewers are synchronized. For example, the application might be presentation software, and the non-synchronization response module 330 might disable a portion of the user interface used to advance to the next slide until all the viewers are synchronized. (Similarly, in some embodiments when all viewers are determined to be synchronized, the sharing module 140 automatically interacts with the application that produces the shared portion, such as automatically advancing to the next slide of a presentation application, or prompting the sharer to do so, or otherwise initiating updating of the shared portion.) In some embodiments, the non-synchronization response module 330 re-sends the shared portion to the identified viewers that are not in synchronization. In some embodiments, a video codec is designed or modified to take the received snapshots into account when determining when to send or re-send the shared portion, and is used to accomplish the re-sending. In some embodiments, the non-synchronization response module 330 determines, after some period of a particular viewer being determined not to be synchronized with respect to the sharer, that the viewer is encountering sharing problems and accordingly removes that viewer from determinations of whether the sharer should wait on account of that viewer. For example, if the second viewer in the example of FIG. 2 were determined to be encountering network problems, the visual summary indication 218 could be revised to note instead that both viewers that are not encountering network problems are in sync with the sharer, and thus the sharer should proceed with discussion, given that waiting for the remaining viewer likely does not make sense.

The sharing module 140 additionally includes a snapshot creation module 355 used by client devices 130 of the viewers to generate snapshots of the shared content. In some embodiments, the snapshot creation module 355 downsamples the shared portion (e.g., to 80×60 pixels) as received from the video decoder on the viewing client 130, then converts the downsampled portion to another image format, such as JPEG. In some embodiments, the snapshot creation module 355 processes the shared portion as stored in the video buffer of the viewing client 120 after rendering, rather than directly processing the shared portion as received from the video decoder, before rendering. The snapshot creation module 355 may create and send snapshots to the sharer according to different schedules in different embodiments, such as at fixed one-second intervals. Alternatively, the snapshot creation module 355 may first compare the last snapshot that it sent to the sharer with the shared portion currently displayed on the client (e.g., after first reducing it to a new snapshot so as to be comparable with the last snapshot sent), and only send a new snapshot if the difference between the two is above some threshold indicating that the image change was sufficiently large. As another alternative, the snapshot creation module 355 may send a snapshot only in response to an explicit request from the sharing client 120. For example, the event capture module 315 might send an explicit request to the viewing clients to send snapshots, after noting the occurrence of an event leading to a change in the shared content of the sharing client 120 (e.g., a slide change event) and sending the changed shared content.

As previously noted, the sharing module 140 may have different functionality on the sharing client 120 and on the viewing clients 130. For example, in some embodiments the viewing clients 130 require less sharing functionality than the sharing client 120, and hence the sharing modules 140 on the viewing clients 130 have less functionality than the sharing module 140 on the sharing client 120. For example, the sharing module 140 of the sharing client 120 might include the properties inference module 305, the content sending module 310, the event capture module 315, the snapshot comparison module 320, the viewer summary generation module 325, and the non-synchronization response module 330, whereas the sharing module 140 of the viewing clients 130 might include only the snapshot creation module 355. Thus, in some embodiments, the sharing module 140 on the viewing clients (for example) may be extremely lightweight, e.g., implemented purely in a scripting language such as JavaScript within a web browser, without any need for plug-ins or extensions. This is particularly advantageous in environments in which viewers lack permissions to install software on their own computing devices.

Figure 4:
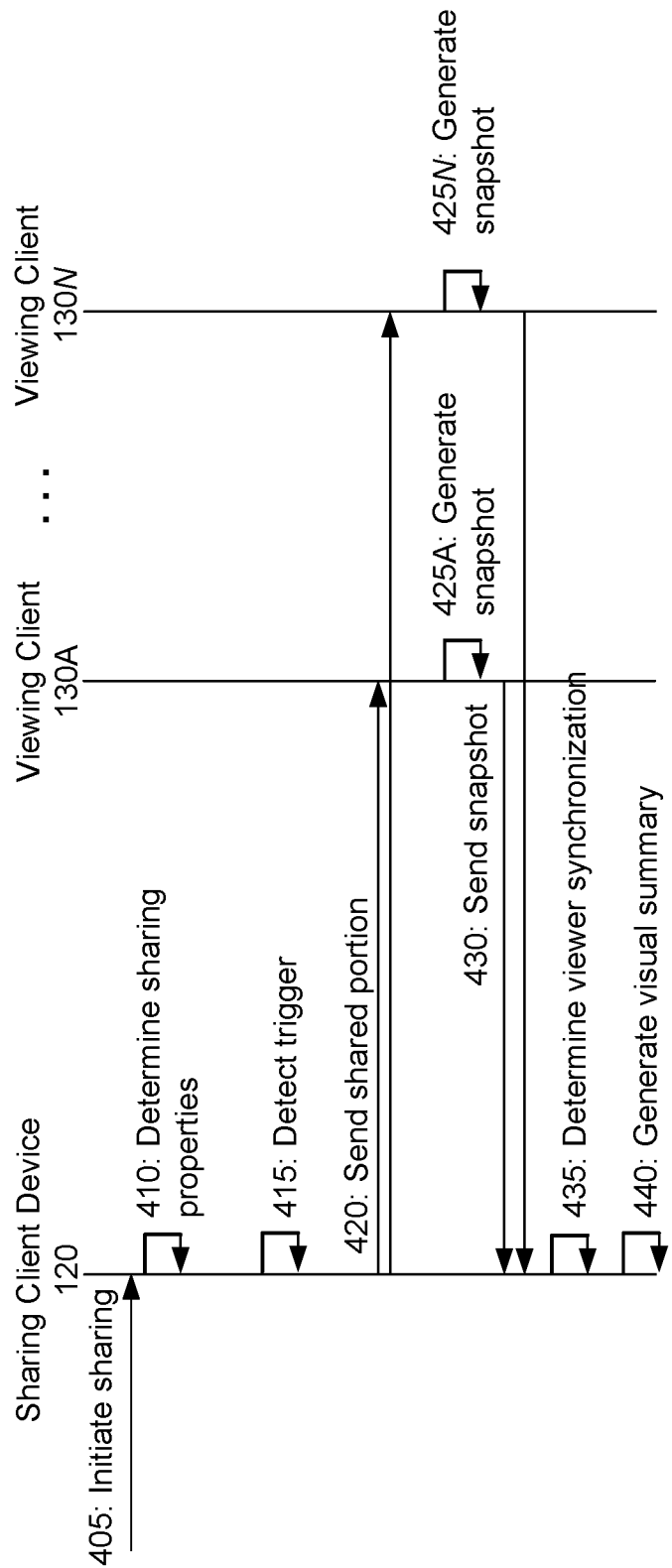
FIG. 4 illustrates the interactions that take place between different entities of FIG. 1 when sharing content portions and summarizing viewer views of the shared portions, according to one embodiment.

FIG. 4 illustrates the interactions that take place between different entities of FIG. 1 when sharing content portions and summarizing viewer views of the shared portions, according to one embodiment.

The sharer initiates 405 screen sharing on the sharing client device 120. For example, in various embodiments the sharer may specify who the viewers will be, which portion of the screen to use as the shared portion, and/or the like.

The sharing module 140 determines 410 sharing properties, e.g., as discussed above with respect to the properties inference module 305.

In some embodiments, the sharing module 140 detects 415 the occurrence of a sharing trigger, such as a lapse of a given period of time, the occurrence of a semantic event in an application encompassing the shared portion, the occurrence of low-level event, or the like. The detection may be performed using the event capture module 315. In other embodiments in which the sharing is performed continuously via a video codec such as those in WebRTC, sharing triggers are not used.

The sharing module 140 sends 420 the shared portion to the client devices 130 of the viewers, as described above with respect to the content sending module 310. In embodiments in which sharing triggers are employed, sending is performed in response to the occurrence of a sharing trigger.

The sharing modules 140 of the various client devices 130 of the viewers generate 425 snapshots of the shared portion as currently displayed to the viewers, and send the snapshots to the sharer, as described above with respect to the snapshot creation module 355.

The sharing module 140 of the sharing client device 120 determines 435 whether viewers are synchronized with respect to the sharer based on the received snapshots. If any viewers are not synchronized, appropriate action is taken, as described above with respect to the non-synchronization module 330. For example, an indicator of a number of viewers not synchronized can be shown to the sharer so that the sharer can decide whether or not to proceed with discussion of the shared portion.

The sharing module 140 of the sharing client device 120 generates 440 and displays a visual summary of the shared portions as viewed by the viewers (including visual indications of identified viewers that are not synchronized with respect to the sharer, if any), as described above with respect to the viewer summary generation module 325.

Figure 5:
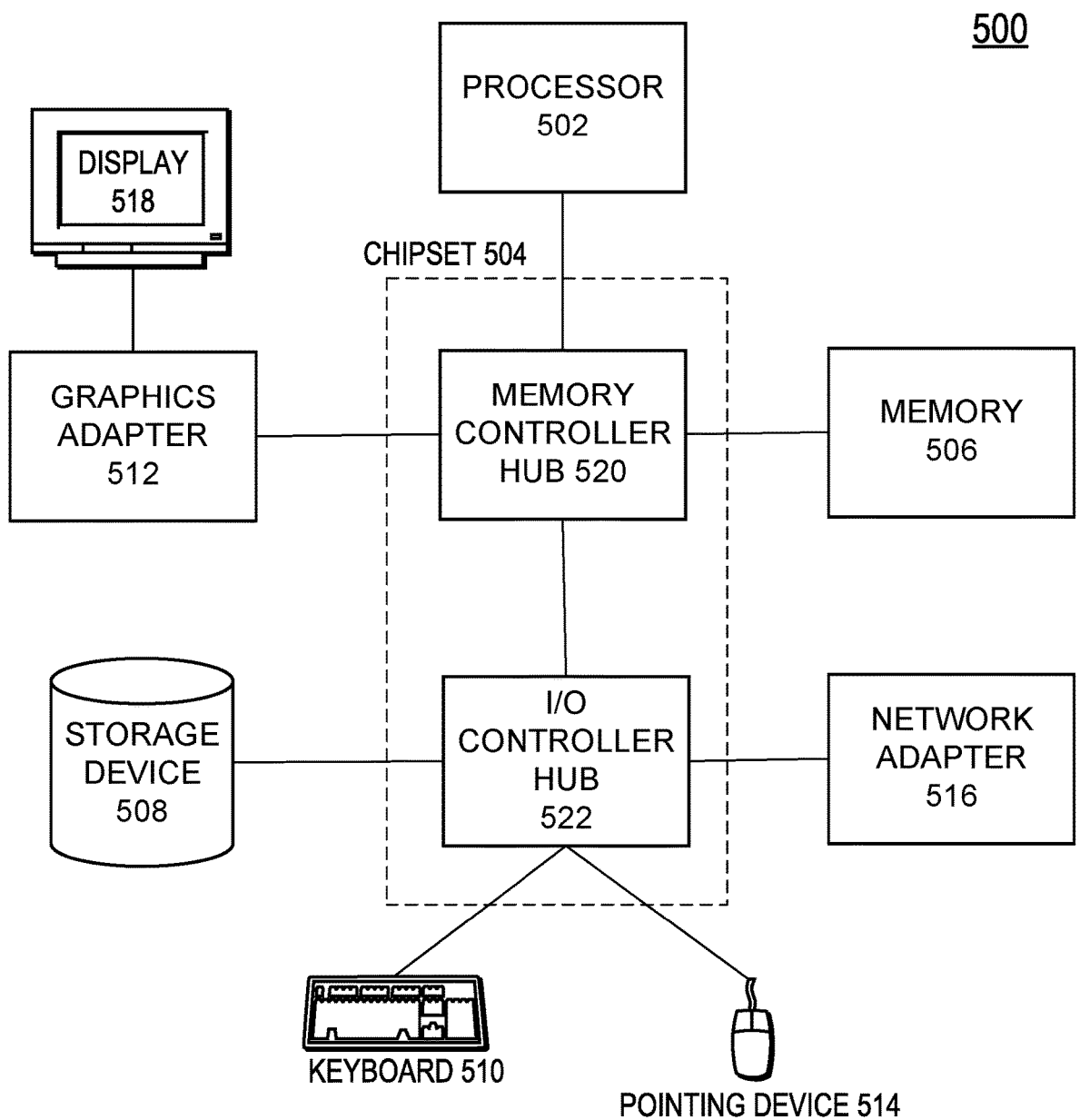
FIG. 5 is a high-level block diagram illustrating physical components of a computer used as part or all of the client devices from FIG. 1, according to one embodiment.

FIG. 5 is a high-level block diagram illustrating physical components of a computer 500 used as part or all of the client devices 120 or 130 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for generating a graphical user interface indicating viewer states of content of a screen of a sharer visually shared with a plurality of viewers over a distributed network, the computer-implemented method comprising:
   identifying a shared portion of the screen content that is being shared with client devices of the plurality of viewers;
   receiving, from each client device of the plurality of viewers, a snapshot image generated on the client device and corresponding to a state of the shared portion currently displayed on a screen of the client device;
   identifying, based on a comparison of the received snapshot images and the shared portion, whether the viewers are synchronized with respect to the sharer; and
   applying a policy based on whether the viewers are synchronized with respect to the sharer,
      wherein applying the policy comprises displaying, using the received snapshot images, a visual summary of the shared portion as currently displayed on screens of the plurality of viewers, the visual summary including a visual indication of identified viewers that are not synchronized with respect to the sharer.

2. The computer-implemented method of claim 1, wherein applying the policy comprises:
   responsive to identifying, based on the received snapshot images, at least a threshold number of viewers that are not synchronized with respect to the sharer:
   preventing further change to the shared portion;
   determining, based on additional later-received snapshot images, that all of the viewers are in synchronization with respect to the sharer; and
   responsive to the determining, enabling further changes to the shared portion.

3. The computer-implemented method of claim 1, wherein applying the policy comprises:
   responsive to identifying, based on the received snapshot images, a viewer that is not synchronized with respect to the sharer, re-sending the shared portion to the identified viewer.

4. The computer-implemented method of claim 1, wherein applying the policy comprises:
   responsive to identifying, based on the received snapshot images, that all the viewers are in synchronization with respect to the sharer, initiating updating of the shared portion by interacting with an application that produces the shared portion.

5. The computer-implemented method of claim 1, wherein displaying the visual summary comprises including the snapshot images received from the client devices within the visual summary.

6. The computer-implemented method of claim 1, wherein generating the visual summary comprises including, in the visual summary, a count derived from a number of snapshot images matching the shared portion.

7. The computer-implemented method of claim 1, wherein generating the visual summary comprises including, in the visual summary, a visual indicator indicating that all the snapshot images match the shared portion.

8. A non-transitory computer-readable storage medium containing executable instructions for generating a graphical user interface indicating viewer states of content of a screen of a sharer visually shared with a plurality of viewers over a distributed network, the instructions when executed by a computer processor performing actions comprising:
   identifying a shared portion of the screen content that is being shared with client devices of the plurality of viewers;
   receiving, from each client device of the plurality of viewers, a snapshot image generated on the client device and corresponding to a state of the shared portion currently displayed on a screen of the client device;

identifying, based on a comparison of the received snapshot images and the shared portion, whether the viewers are synchronized with respect to the sharer; and applying a policy based on whether the viewers are synchronized with respect to the sharer, wherein applying the policy comprises displaying, using the received snapshot images, a visual summary of the shared portion as currently displayed on screens of the plurality of viewers, the visual summary including a visual indication of identified viewers that are not synchronized with respect to the sharer.

9. The non-transitory computer-readable storage medium of claim 8, wherein applying the policy comprises:

responsive to identifying, based on the received snapshot images, at least a threshold number of viewers that are not synchronized with respect to the sharer:

preventing further change to the shared portion;

determining, based on additional later-received snapshot images, that all of the viewers are in synchronization with respect to the sharer; and responsive to the determining, enabling further changes to the shared portion.

10. The non-transitory computer-readable storage medium of claim 8, wherein applying the policy comprises:

responsive to identifying, based on the received snapshot images, a viewer that is not synchronized with respect to the sharer, re-sending the shared portion to the identified viewer.

11. The non-transitory computer-readable storage medium of claim 8, wherein applying the policy comprises:

responsive to identifying, based on the received snapshot images, that all the viewers are in synchronization with respect to the sharer, initiating updating of the shared portion by interacting with an application that produces the shared portion.

12. The non-transitory computer-readable storage medium of claim 8, wherein displaying the visual summary comprises including the snapshot images received from the client devices within the visual summary.

13. The non-transitory computer-readable storage medium of claim 8, wherein generating the visual summary comprises including, in the visual summary, a count derived from a number of snapshot images matching the shared portion.

14. The non-transitory computer-readable storage medium of claim 8, wherein generating the visual summary comprises including, in the visual summary, a visual indicator indicating that all the snapshot images match the shared portion.

15. A computer system comprising:

a computer processor; and executable instructions that when executed by the computer processor perform actions comprising:

identifying a shared portion of the screen content that is being shared with client devices of the plurality of viewers;

receiving, from each client device of the plurality of viewers, a snapshot image generated on the client device and corresponding to a state of the shared portion currently displayed on a screen of the client device;

identifying, based on a comparison of the received snapshot images and the shared portion, whether the viewers are synchronized with respect to the sharer; and applying a policy based on whether the viewers are synchronized with respect to the sharer, wherein applying the policy comprises displaying, using the received snapshot images, a visual summary of the shared portion as currently displayed on screens of the plurality of viewers, the visual summary including a visual indication of identified viewers that are not synchronized with respect to the sharer.

16. The computer system of claim 15, wherein applying the policy comprises:

responsive to identifying, based on the received snapshot images, at least a threshold number of viewers that are not synchronized with respect to the sharer:

preventing further change to the shared portion;

determining, based on additional later-received snapshot images, that all of the viewers are in synchronization with respect to the sharer; and responsive to the determining, enabling further changes to the shared portion.

17. The computer system of claim 15, wherein applying the policy comprises:

responsive to identifying, based on the received snapshot images, a viewer that is not synchronized with respect to the sharer, re-sending the shared portion to the identified viewer.

18. The computer system of claim 15, wherein applying the policy comprises:

responsive to identifying, based on the received snapshot images, that all the viewers are in synchronization with respect to the sharer, initiating updating of the shared portion by interacting with an application that produces the shared portion.

19. The computer system of claim 15, wherein displaying the visual summary comprises including the snapshot images received from the client devices within the visual summary.

20. The computer system of claim 15, wherein generating the visual summary comprises including, in the visual summary, a count derived from a number of snapshot images matching the shared portion.

21. The computer-implemented method of claim 1, wherein receiving the snapshot image comprises at least one of:

receiving snapshot images from each client device at fixed time intervals;

receiving the snapshot image from each client device based on a comparison between the snapshot image and a last snapshot image sent by the client device;

receiving the snapshot image from each client device in response to a request sent to the client device.

22. The computer-implemented method of claim 1, wherein identifying whether the viewers are synchronized with respect to the sharer is based on a pixel-wise comparison of the received snapshot images and the shared portion.

23. The computer system of claim 15, wherein receiving the snapshot image comprises at least one of:

receiving snapshot images from each client device at fixed time intervals;

receiving the snapshot image from each client device based on a comparison between the snapshot image and a last snapshot image sent by the client device;

receiving the snapshot image from each client device in response to a request sent to the client device.

24. The computer system of claim 15, wherein identifying whether the viewers are synchronized with respect to the sharer is based on a pixel-wise comparison of the received snapshot images and the shared portion.

* * * * *